(12) United States Patent
Sicola

(10) Patent No.: US 7,913,038 B2
(45) Date of Patent: Mar. 22, 2011

(54) DISTRIBUTED STORAGE SYSTEM WITH ACCELERATED STRIPING

(75) Inventor: Stephen J. Sicola, Monument, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 814 days.

(21) Appl. No.: 11/477,967

(22) Filed: Jun. 29, 2006

(65) Prior Publication Data

US 2007/0011425 A1  Jan. 11, 2007

Related U.S. Application Data

(63) Continuation-in-part of application No. 11/145,403, filed on Jun. 3, 2005.

(51) Int. Cl.
*G06F 13/00* (2006.01)

(52) U.S. Cl. .......... 711/114; 711/165; 711/203

(58) Field of Classification Search .......... 711/114, 711/165, 203
See application file for complete search history.

(56) References Cited

U.S. PATENT DOCUMENTS

| | | |
|---|---|---|
| 3,725,883 A | 4/1973 | Bennett et al. |
| 4,454,566 A | 6/1984 | Coyne |
| 4,754,397 A | 6/1988 | Varaiya et al. |
| 4,903,170 A | 2/1990 | Finney et al. |
| 5,124,886 A | 6/1992 | Golobay |
| 5,247,427 A | 9/1993 | Driscoll et al. |
| 5,325,270 A | 6/1994 | Wenger et al. |
| 5,511,177 A | 4/1996 | Kagimasa et al. |
| 5,517,373 A | 5/1996 | Hanson |
| 5,604,662 A | 2/1997 | Anderson et al. |
| 5,729,763 A | 3/1998 | Leshem |
| 5,752,257 A | 5/1998 | Ripoll et al. |
| 5,822,184 A | 10/1998 | Rabinovitz |
| 5,828,547 A | 10/1998 | Francovich et al. |
| 5,889,650 A | 3/1999 | Bertilsson et al. |
| 5,913,926 A | 6/1999 | Anderson et al. |
| 5,974,490 A | 10/1999 | Fujimura et al. |
| 6,076,142 A | 6/2000 | Corrington et al. |
| 6,115,788 A | 9/2000 | Thowe |
| 6,201,692 B1 | 3/2001 | Gamble et al. |
| 6,230,217 B1 | 5/2001 | Tuccio et al. |
| 6,243,790 B1 | 6/2001 | Yorimitsu |
| 6,351,374 B1 | 2/2002 | Sherry |
| 6,397,293 B2 | 5/2002 | Shrader et al. |
| 6,442,022 B1 | 8/2002 | Paul |
| 6,464,509 B1 | 10/2002 | Emberty et al. |
| 6,496,376 B1 | 12/2002 | Plunkett et al. |
| 6,526,477 B1 | 2/2003 | Yuan et al. |
| 6,574,687 B1 | 6/2003 | Teachout et al. |
| 6,618,246 B2 | 9/2003 | Sullivan et al. |
| 6,629,262 B1 | 9/2003 | Inagaki et al. |
| 6,651,138 B2 | 11/2003 | Lai et al. |
| 6,683,793 B1 | 1/2004 | Campbell et al. |

(Continued)

FOREIGN PATENT DOCUMENTS

EP  1026688 A2  8/2000

(Continued)

*Primary Examiner* — Yong Choe
(74) *Attorney, Agent, or Firm* — Fellers, Snider, et al.

(57) ABSTRACT

A data storage apparatus and associated method is provided wherein a software system is resident in a memory space and is configured to encode data retrieved from a first number of logical units into a single channel in order to store the data in a second number of logical units.

16 Claims, 18 Drawing Sheets

U.S. PATENT DOCUMENTS

| | | |
|---|---|---|
| 6,691,209 B1 | 2/2004 | O'Connell |
| 6,708,265 B1 | 3/2004 | Black |
| 6,748,502 B2 | 6/2004 | Watanabe et al. |
| 6,820,171 B1 | 11/2004 | Weber et al. |
| 6,826,778 B2 | 11/2004 | Bopardikar et al. |
| 2002/0131257 A1 | 9/2002 | Agard |
| 2002/0144044 A1 | 10/2002 | Moon et al. |
| 2003/0041201 A1 | 2/2003 | Rauscher |
| 2003/0070043 A1 | 4/2003 | Merkey |
| 2003/0081378 A1 | 5/2003 | Debbins et al. |
| 2003/0192005 A1* | 10/2003 | Williamson et al. .......... 714/758 |
| 2004/0057203 A1 | 3/2004 | Rabinovitz |
| 2004/0133743 A1* | 7/2004 | Ito et al. ........................ 711/114 |
| 2006/0047908 A1* | 3/2006 | Chikusa et al. ............... 711/114 |
| 2006/0268444 A1* | 11/2006 | DeCenzo et al. ............... 360/69 |

FOREIGN PATENT DOCUMENTS

| | | |
|---|---|---|
| WO | WO 97/45784 A2 | 12/1997 |
| WO | WO 99/60832 A1 | 11/1999 |

* cited by examiner

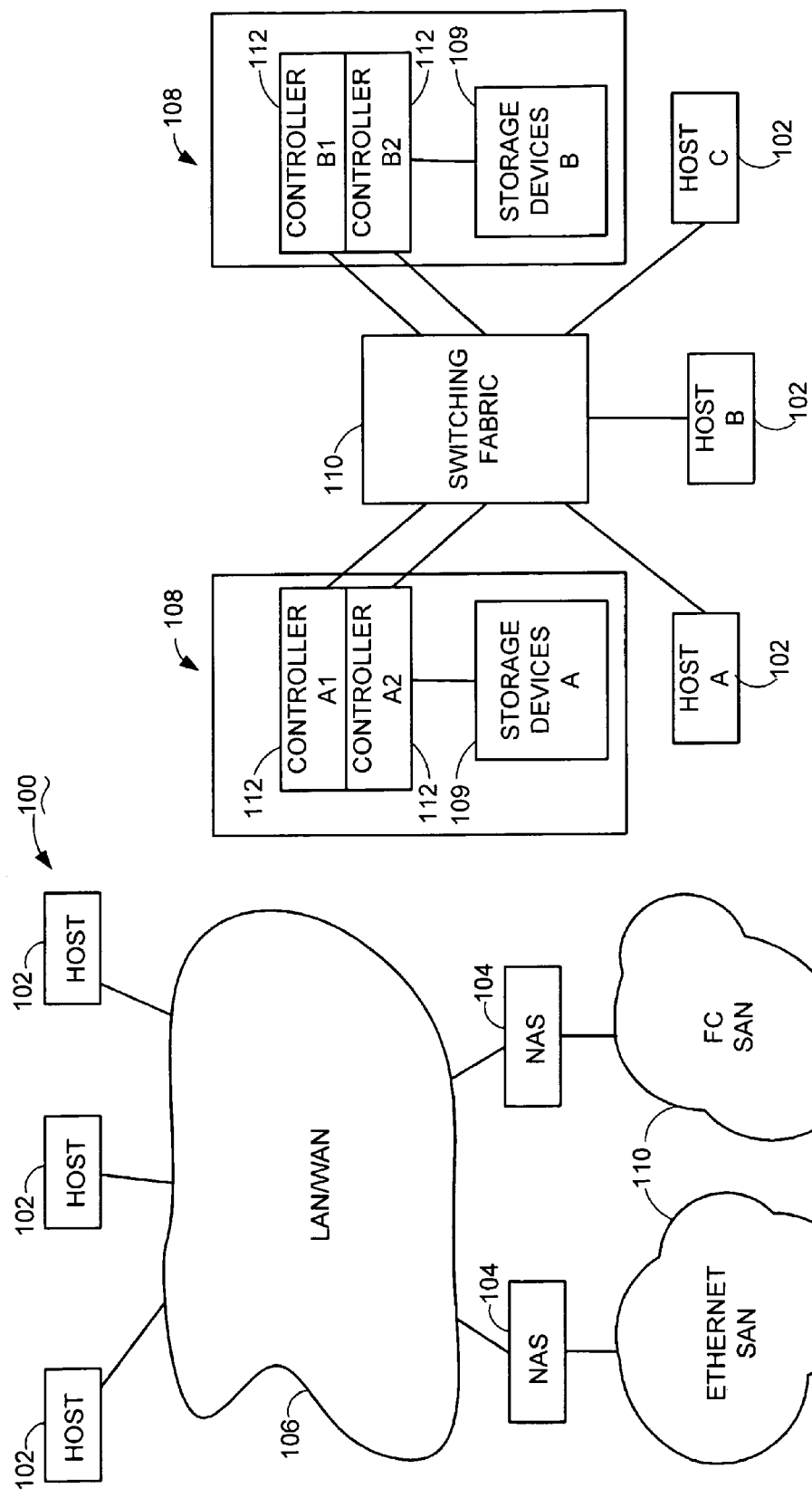

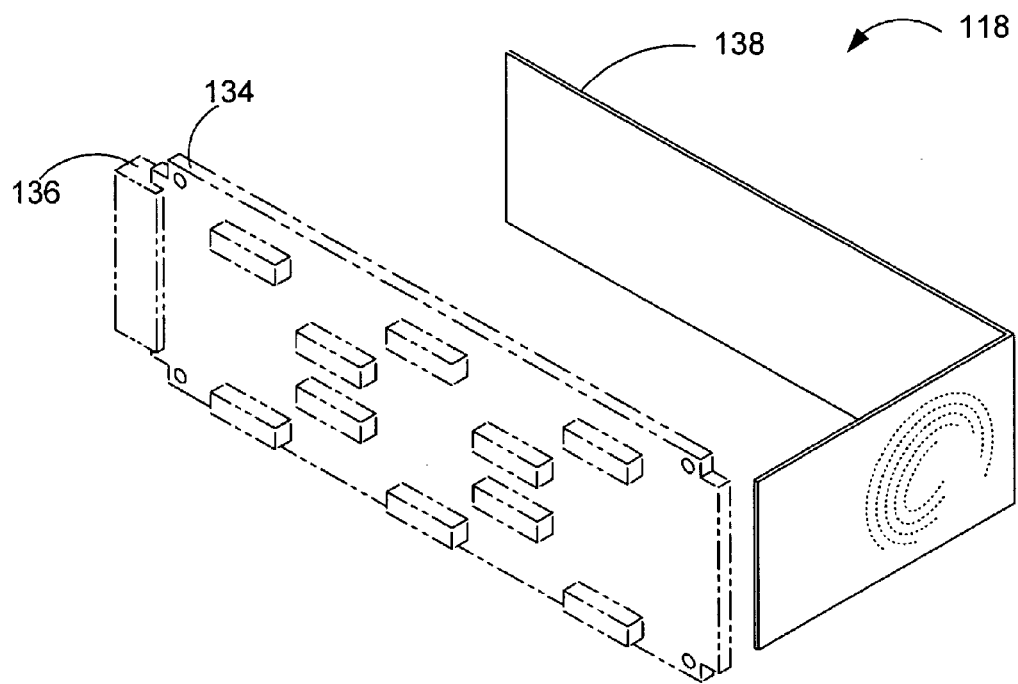
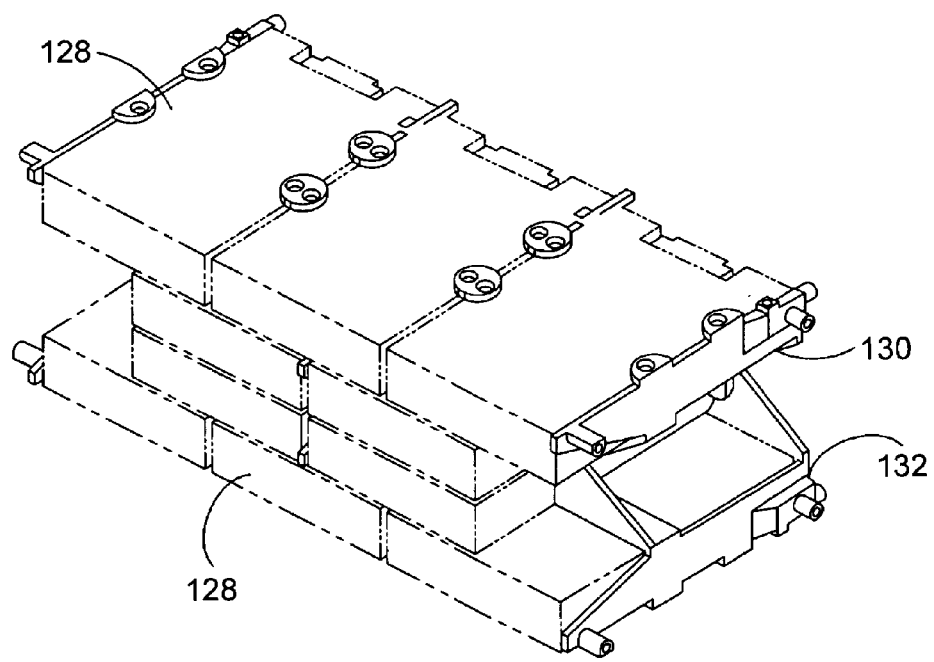
FIG. 4

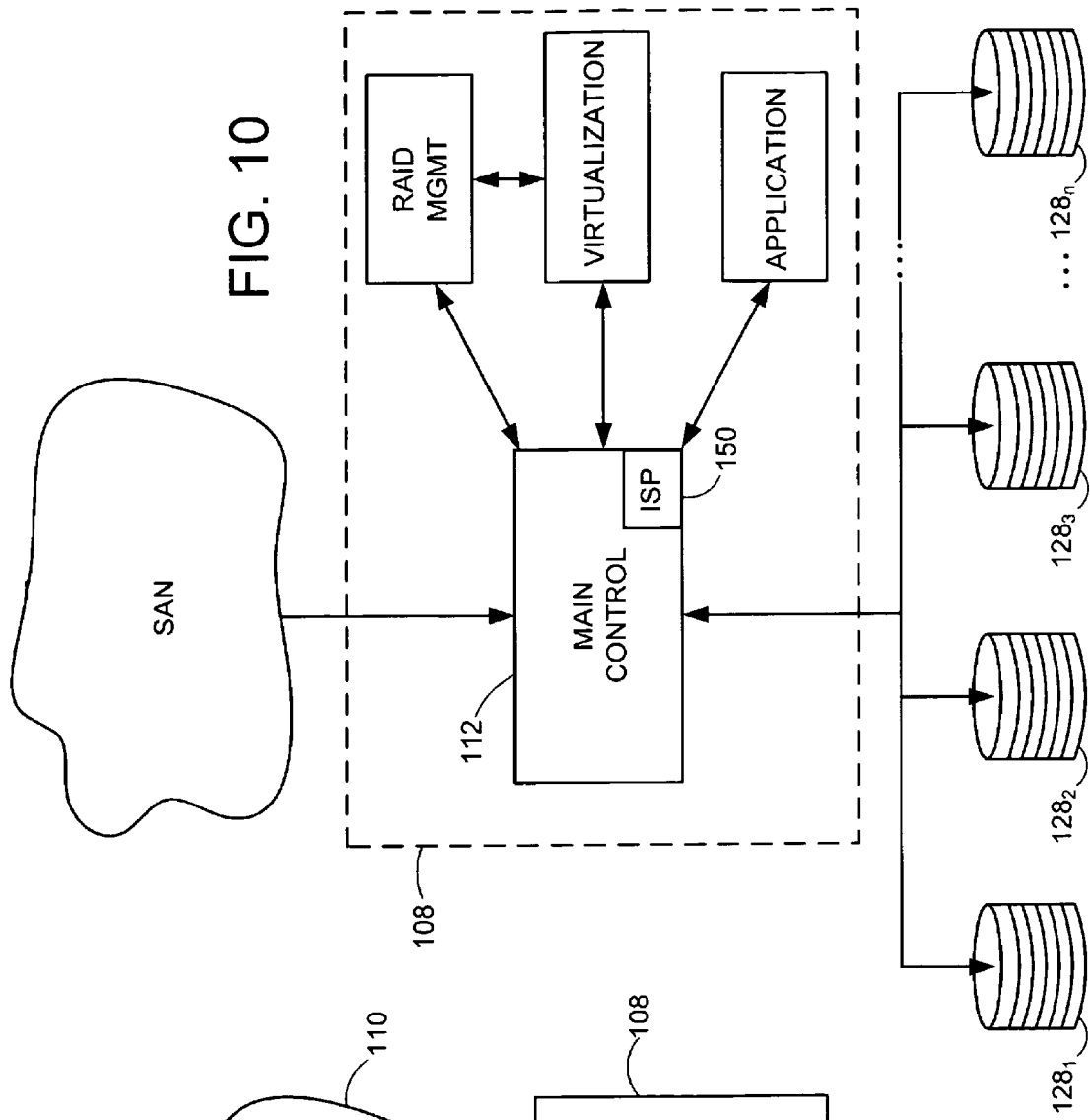
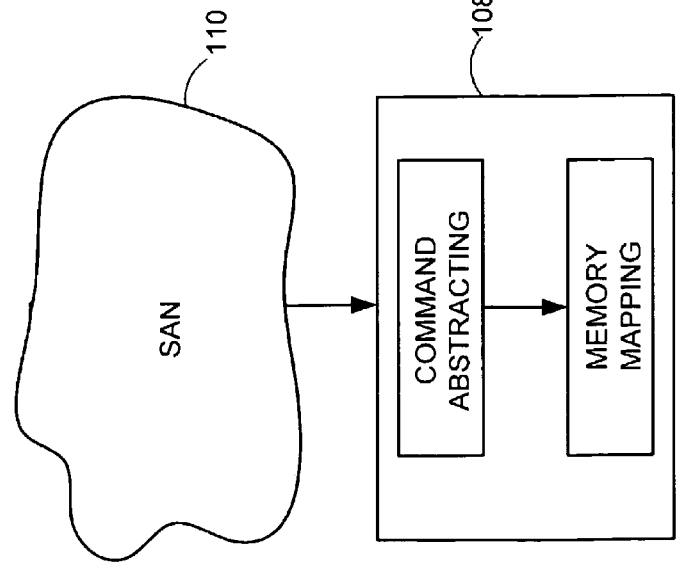

|   | A | B | C | D | E | F | G | H |
|---|---|---|---|---|---|---|---|---|
| LUN 1 | A1 | B1 | C1 | D1 | E1 | F1 | G1 | H1 |
|  | A2 | B2 | C2 | D2 | E2 | F2 | G2 | H2 |
|  | A3 | B3 | C3 | D3 | E3 | F3 | G3 | H3 |
|  | A4 | B4 | C4 | D4 | E4 | F4 | G4 | H4 |
| LUN 2 | A5 | B5 | C5 | D5 | E5 | F5 | G5 | H5 |
|  | A6 | B6 | C6 | D6 | E6 | F6 | G6 | H6 |
|  | A7 | B7 | C7 | D7 | E7 | F7 | G7 | H7 |
|  | A8 | B8 | C8 | D8 | E8 | F8 | G8 | H8 |

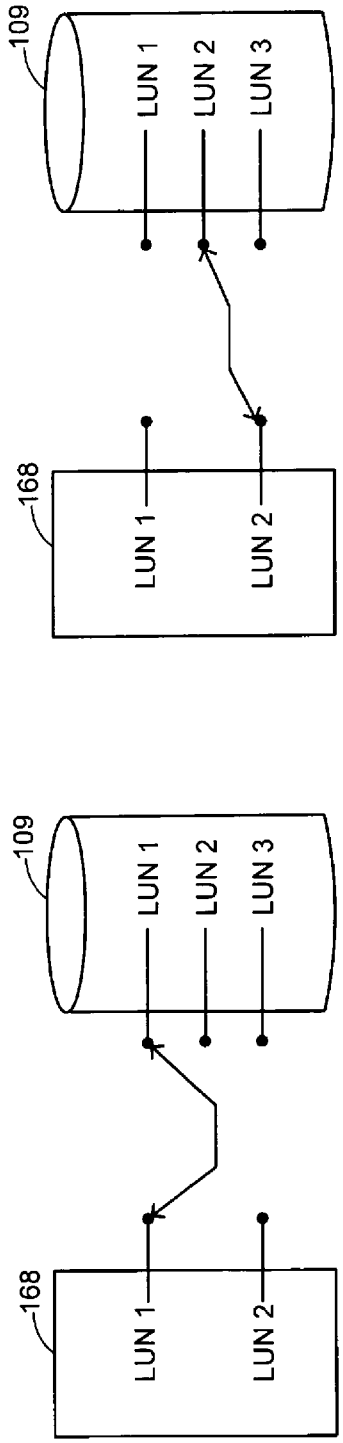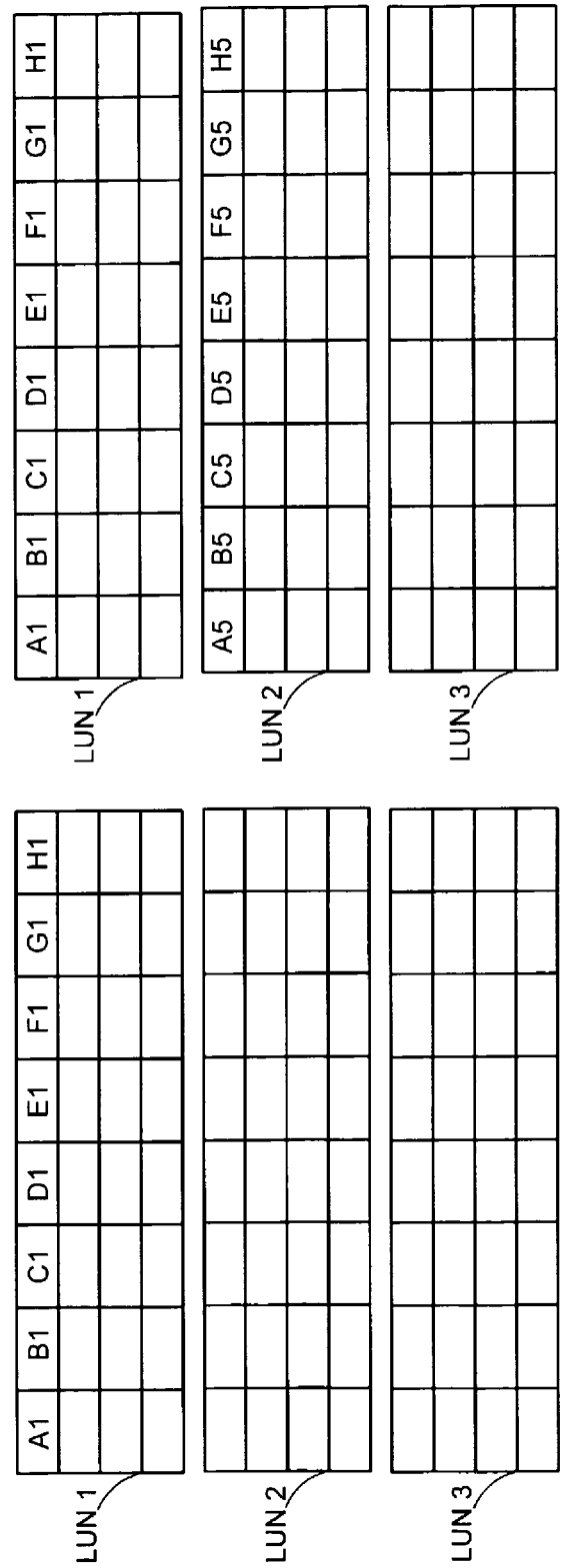
FIG. 15
FIG. 14

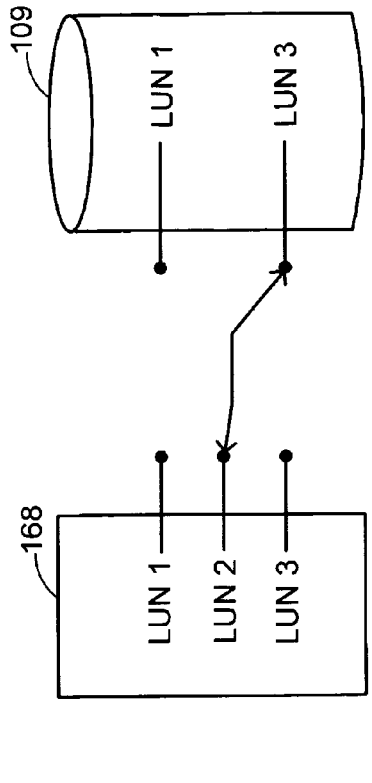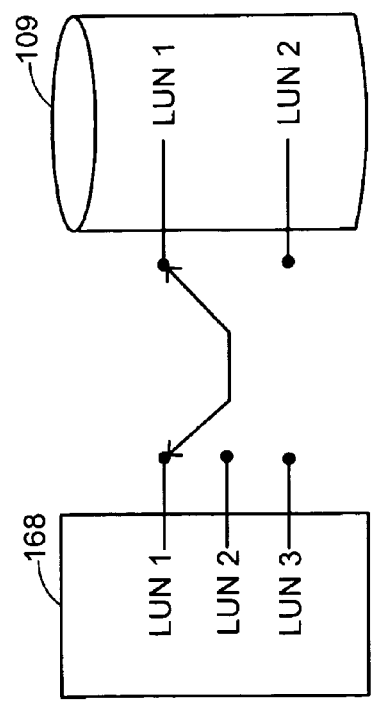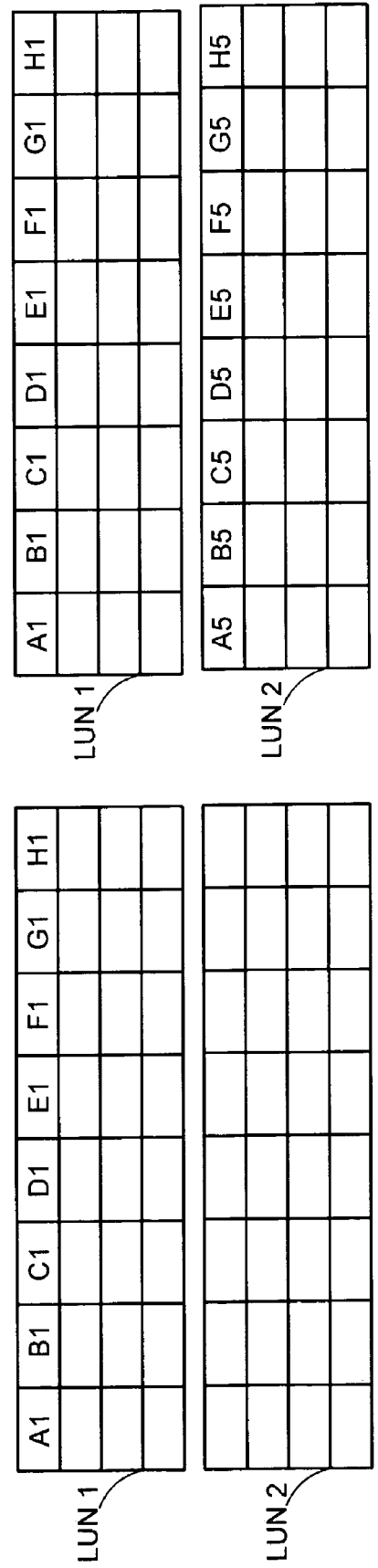
FIG. 23
FIG. 22

DISTRIBUTED STORAGE SYSTEM WITH ACCELERATED STRIPING

RELATED APPLICATIONS

This application is a continuation-in-part of U.S. application Ser. No. 11/145,403 filed Jun. 3, 2005 and assigned to the assignee of this application.

FIELD OF THE INVENTION

The claimed invention relates generally to the field of distributed data storage systems and more particularly, but not by way of limitation, to an apparatus and method for restriping data stored in memory.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, stored data may need to be moved for reliability concerns, or more storage capacity may need to be added to accommodate a growing network. In these events either the host or the network must be modified to make it aware of the existence of the new or changed storage space. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. A distributed computing environment uses these intelligent storage devices for global provisioning as well as for global striping and restriping of stored data. It is to this solution that embodiments of the present invention are directed.

SUMMARY OF THE INVENTION

Embodiments of the present invention are generally directed to a distributed storage system with restriping capability that avoids the intensive overhead associated with backing up the originally stored data and restoring it in the restriped arrangement.

In some embodiments a data storage device is provided with a software system resident in a memory space that is configured to encode data retrieved from a first number of logical units into a single channel in order to store the data in a second number of logical units.

In some embodiments a method is provided for encoding data that is striped across a first number of logical units into a single channel, and decoding the encoded data across a second number of logical units.

In some embodiments a data storage system is provided with an intelligent storage element having a memory space, and means for restriping data in logical units of the memory space.

These and various other features and advantages which characterize the claimed invention will become apparent upon reading the following detailed description and upon reviewing the associated drawings.

BRIEF DESCRIPTION OF THE DRAWINGS

FIG. 1 is a diagrammatic representation of a computer system in which embodiments of the present invention are useful.

FIG. 2 is a simplified diagrammatic representation of the computer system of FIG. 1.

FIG. 4 is a partially exploded isometric view of a multiple disc array of the intelligent storage element of FIG. 3.

FIG. 9 is a functional block diagram representation of the command abstracting and associated memory mapping services performed by the intelligent storage element of FIG. 3.

FIG. 10 is a functional block diagram of other exemplary data services performed by the intelligent storage element of FIG. 3.

FIGS. 14-21 are sequential diagrammatic depictions of the sequential synchronous multiplexing and demultiplexing associated with restriping data originally stored in two LUNS across three LUNS.

FIGS. 22-29 are sequential diagrammatic depictions of restoring the data from three LUNS to two LUNS.

DETAILED DESCRIPTION

Figure 3:
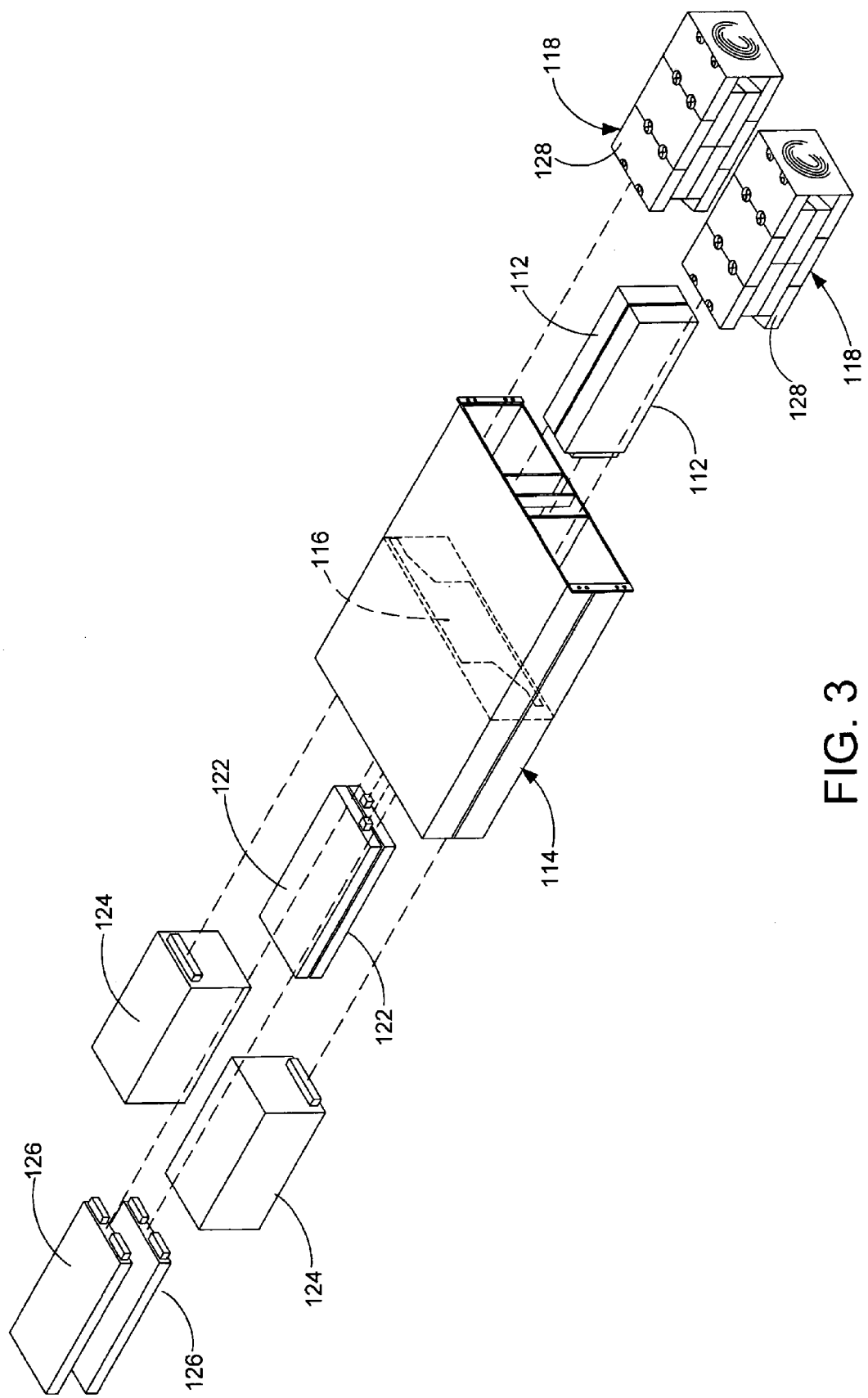
FIG. 3 is an exploded isometric view of an intelligent storage element constructed in accordance with embodiments of the present invention.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements ("ISEs") 108. Accordingly, SANs 110 connect the servers 104 to the ISEs 108 for access to the stored data. The ISEs 108 provide blocks of data storage capacity 109 for storing the data over various selected communication protocols such as serial ATA and fibre-channel, with enterprise or desktop class storage medium within it.

FIG. 2 is a simplified diagrammatic view of the computer system 100 of FIG. 1. The hosts 102 interact with each other as well as with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). The controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

It is further contemplated that the A host computer 102 and the A ISE 108 can be physically located at a first site, the B host computer 102 and B ISE 108 can be physically located at a second site, and the C host computer 102 can be yet at a third site, although such is merely illustrative and not limiting. All entities on the distributed computer system are connected over some type of computer network.

FIG. 3 illustrates an ISE 108 constructed in accordance with embodiments of the present invention. A shelf 114 defines cavities for receivingly engaging the controllers 112 in electrical connection with a midplane 116. The shelf 114 is supported, in turn, within a cabinet (not shown). A pair of multiple disc assemblies (MDAs) 118 are receivingly engageable with the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

FIG. 4 is an enlarged partially exploded isometric view of an MDA 118 constructed in accordance with some embodiments of the present invention. The MDA 118 has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of patent application Ser. No. 10/884,605 entitled Carrier Device and Method for a Multiple Disc Array which is assigned to the assignee of the present invention and incorporated herein by reference. Another illustrative embodiment of the MDA is the subject matter of patent application Ser. No. 10/817,378 of the same title which is also assigned to the assignee of the present invention and incorporated herein by reference. In alternative equivalent embodiments the MDA 118 can be provided within a sealed enclosure, as discussed below.

Figure 5:
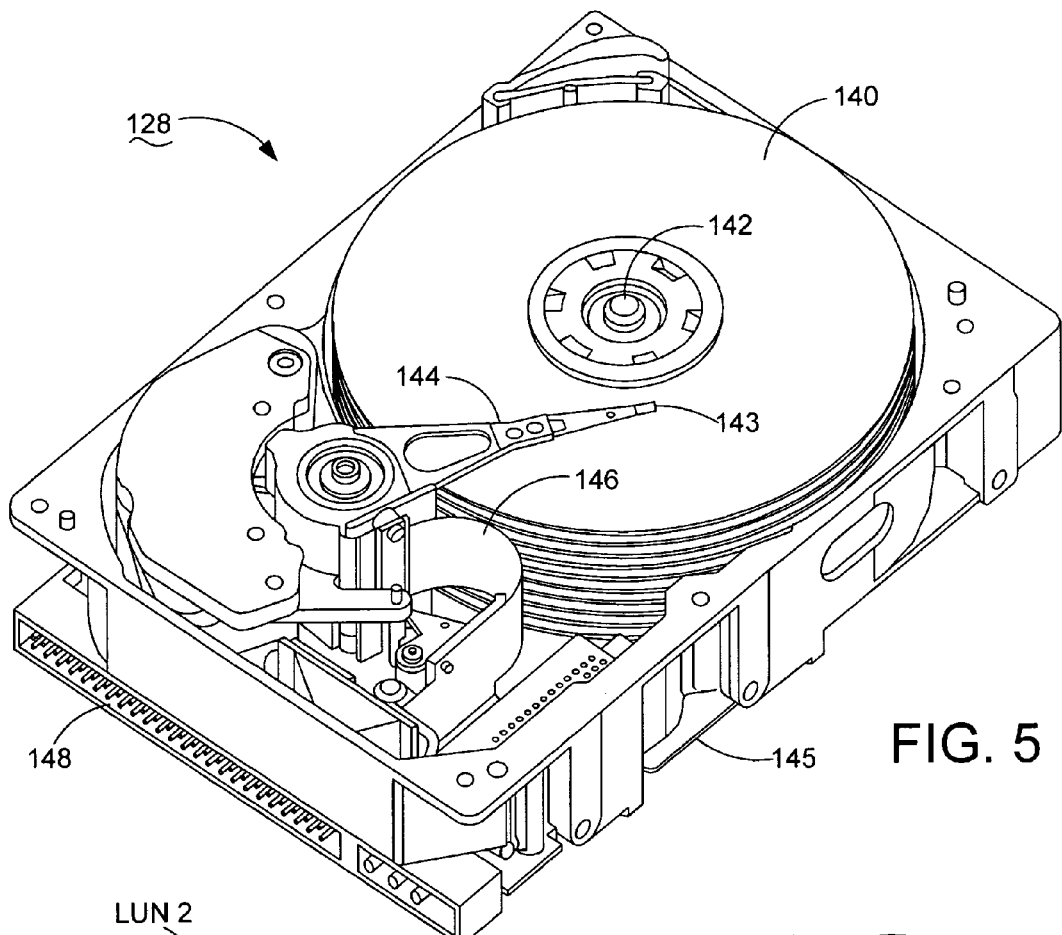
FIG. 5 is an exemplary data storage device used in the multiple disc array of FIG. 4.

FIG. 5 is an isometric view of an illustrative data storage device 128 suited for use with embodiments of the present invention and in the form of a rotating media disc drive. Although a rotating spindle with moving data storage medium is used for discussion purposes below, in alternative equivalent embodiment a non-rotating medium device, such as a solid state memory device is used. A data storage disc 140 is rotated by a motor 142 to present data storage locations of the disc 140 to a read/write head ("head") 143. The head 143 is supported at the distal end of a rotary actuator 144 that is capable of moving the head 143 radially between inner and outer tracks of the disc 140. The head 143 is electrically connected to a circuit board 145 by way of a flex circuit 146. The circuit board 145 is adapted to receive and send control signals controlling the functions of the data storage device 128. A connector 148 is electrically connected to the circuit board 145, and is adapted for connecting the data storage device 128 with the circuit board 134 (FIG. 4) of the MDA 118.

Figure 6:
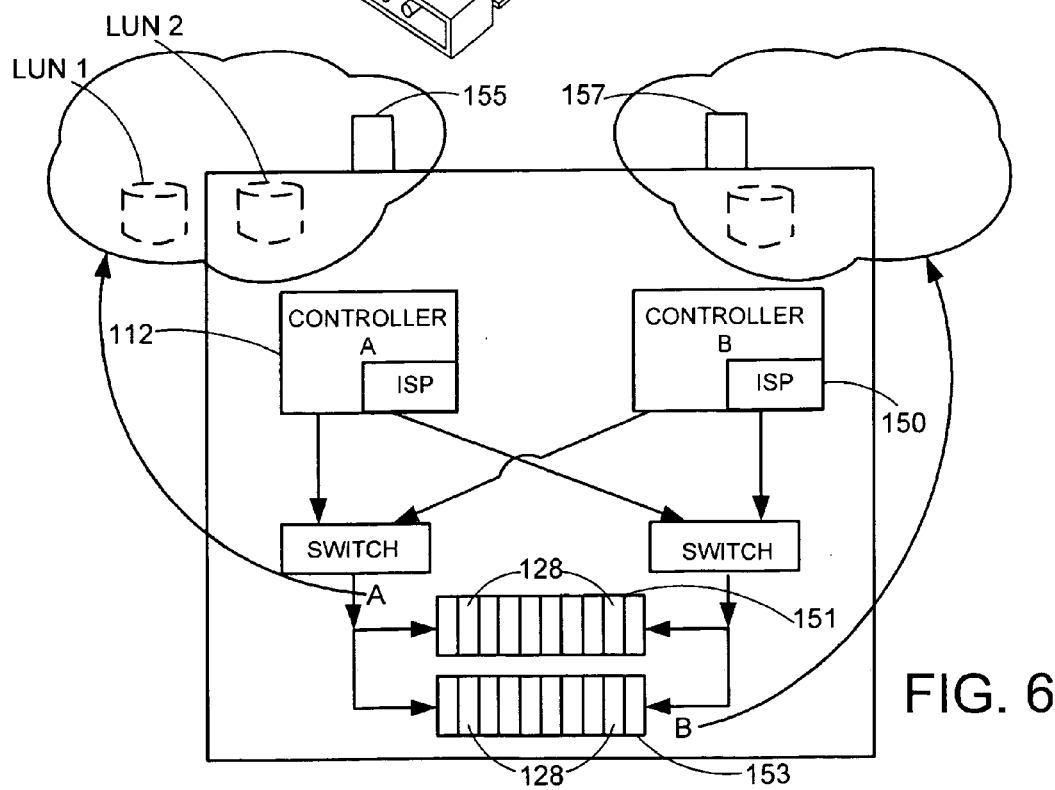
FIG. 6 is a functional block diagram of the intelligent storage element of FIG. 3.

FIG. 6 is a diagrammatic view of an ISE 108 constructed in accordance with embodiments of the present invention. The controllers 112 operate in conjunction with intelligent storage processors (ISPs) 150 to provide managed reliability of the data integrity. The ISPs 150 can be resident in the controller 112, in the MDA 118, or elsewhere within the ISE 108.

The controllers 112 are responsive to remote access commands to data packs 151, 153 via communication ports 155, 157, respectively. For purposes of illustration the controller 112 in FIG. 6 has created logical unit ("LUN") 1 and LUN 2 from data pack 151, and LUN 10 from data pack 153, all in response to host commands for storage capacity. Also for the sake of the present description, the data packs 151, 153 will be assumed to contain eight data storage devices 128 for data storage and two spare data storage devices 128.

Aspects of the managed reliability include invoking reliable data storage formats such as RAID strategies. For example, by providing a system for selectively employing a selected one of a plurality of different RAID formats creates a relatively more robust system for storing data, and permits optimization of firmware algorithms that reduce the complexity of software used to manage the MDA 118, as well as resulting in relatively quicker recovery from storage fault conditions. These and other aspects of this multiple RAID format system is described in patent application Ser. No. 10/817,264 entitled Storage Media Data Structure and Method which is assigned to the present assignee and incorporated herein by reference.

Managed reliability can also include scheduling of diagnostic and correction routines based on a monitored usage of the system. Data recovery operations are executed for copying and reconstructing data. The ISP 150 is integrated with the MDAs 118 in such as way to facilitate "self-healing" of the overall data storage capacity without data loss. These and other aspects of the managed reliability aspects contemplated herein are disclosed in patent application Ser. No. 10/817,617 entitled Managed Reliability Storage System and Method which is assigned to the present assignee and incorporated herein by reference. Other aspects of the managed reliability include responsiveness to predictive failure indications in relation to predetermined rules, as disclosed for example in patent application Ser. No. 11/040,410 entitled Deterministic Preventive Recovery From a Predicted Failure in a Distributed Storage System which is assigned to the present assignee and incorporated herein by reference.

Figure 7:
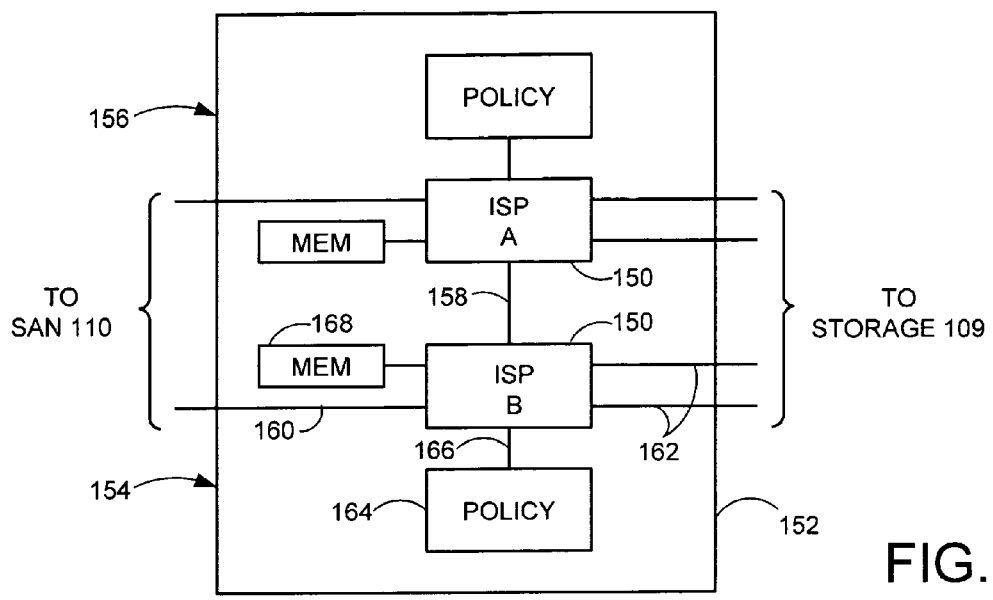
FIG. 7 is a functional block diagram of the intelligent storage processor circuit board of the intelligent storage element of FIG. 3.

FIG. 7 is a diagrammatic illustration of an ISP circuit board 152 in which resides a pair of redundant ISPs 150. The ISP 150 interfaces the data storage capacity 109 to the SAN fabric 110. Each ISP 150 can manage assorted storage services such as routing, volume management, and data migration and replication. The ISPs 150 divide the board 152 into two ISP subsystems 154, 156 coupled by a bus 158. The ISP subsystem 154 includes the ISP 150 denoted "B" which is connected to the fabric 110 and the storage capacity 109 by links 160, 162, respectively. The ISP subsystem 154 also includes a policy processor 164 executing a real-time operating system. The ISP 150 and policy processor 164 communicate over bus 166, and both communicate with memory 168.

Figure 8:
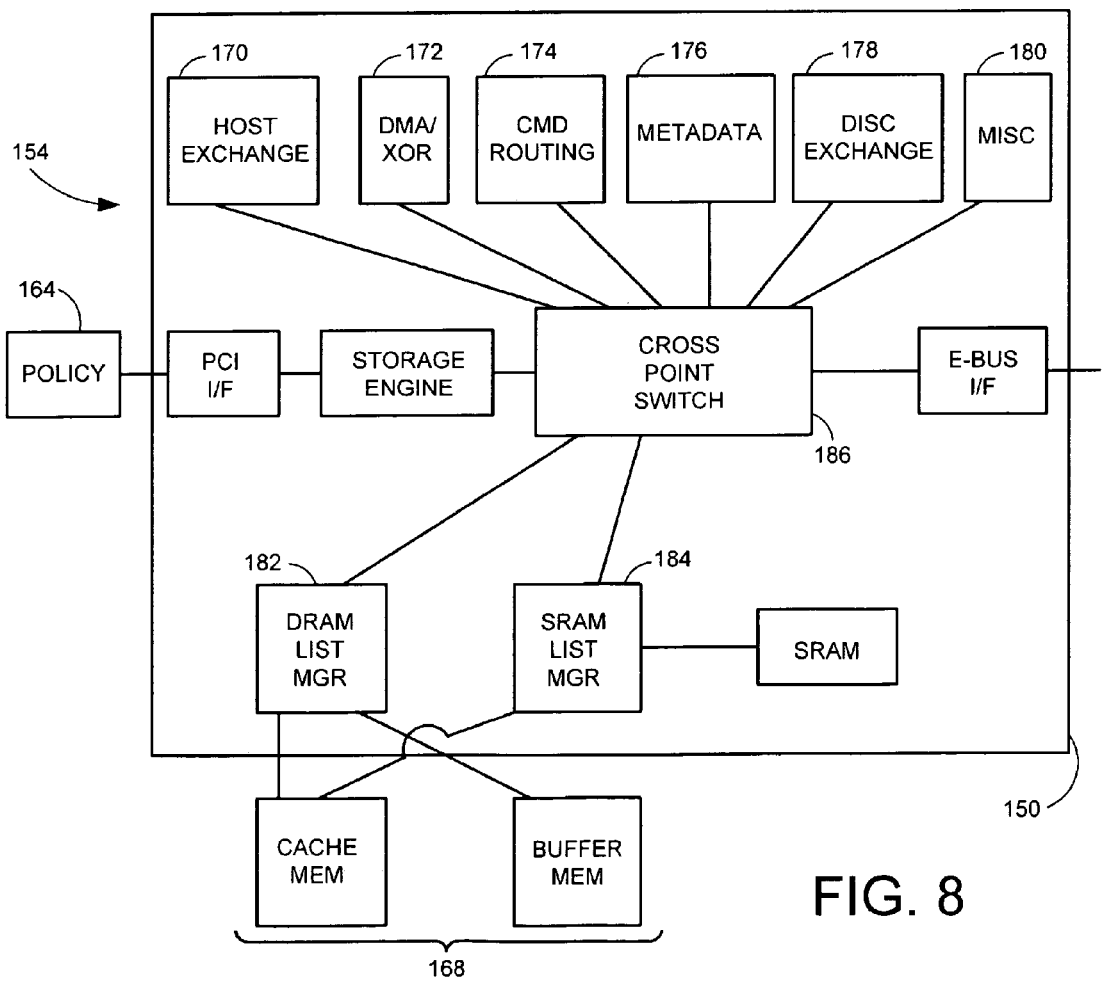
FIG. 8 is a functional block diagram of the intelligent storage processor of the intelligent storage element of FIG. 3.

FIG. 8 is a diagrammatic view of an illustrative ISP subsystem 154 constructed in accordance with embodiments of the present invention. The ISP 150 includes a number of functional controllers (170-180) in communication with list managers 182, 184 via a cross point switch (CPS) 186 message crossbar. Accordingly, the controllers (170-180) can each generate CPS messages in response to a given condition and send the messages through the CPS 186 to a list manager 182, 184 in order to access a memory module and/or invoke an ISP 150 action. Likewise, responses from a list manager 182, 184 can be communicated to any of the controllers (170-180) via the CPS 186. The arrangement of FIG. 8 and associated discussion are illustrative and not limiting of the contemplated embodiments of the present invention.

The policy processor 164 can be programmed to execute desired operations via the ISP 150. For example, the policy processor 164 can communicate with the list managers 182, 184, that is send and receive messages, via the CPS 186. Responses to the policy processor 164 can serve as interrupts signaling the reading of memory 168 registers.

FIG. 9 is a diagrammatic illustration of the flexibility advantages of the ISE 108, by way of the intelligent controllers 112, to communicate with a host 102 in any of a preselected plurality of communication protocols, such as FC, iSCSI, or SAS. The ISE 108 can be programmed to ascertain the abstraction level of a host command, and to map a virtual storage volume to the physical storage 109 associated with the command accordingly.

For present purposes, the term "virtual storage volume" means a logical entity that generally corresponds to a logical abstraction of physical storage. "Virtual storage volume" can include, for example, an entity that is treated (logically) as though it was consecutively addressed blocks in a fixed block architecture or records in a count-key-data architecture. A virtual storage volume can be physically located on more than one storage element.

FIG. 10 is a diagrammatic illustration of types of data management services that can be conducted by the ISE 108 independently of any host 102. For example, RAID management can be locally controlled for fault tolerant data integrity sake, with striping of data performed within a desired number of the data storage devices $128_1$, $128_2$, $128_3$ ... $128_n$. Virtualization services can be locally controlled to allocate and/or deallocate memory capacity to logical entities. Application routines, such as the managed reliability schemes discussed above and data migration between logical volumes within the same ISE 108, can likewise be controlled locally.

Figure 11:
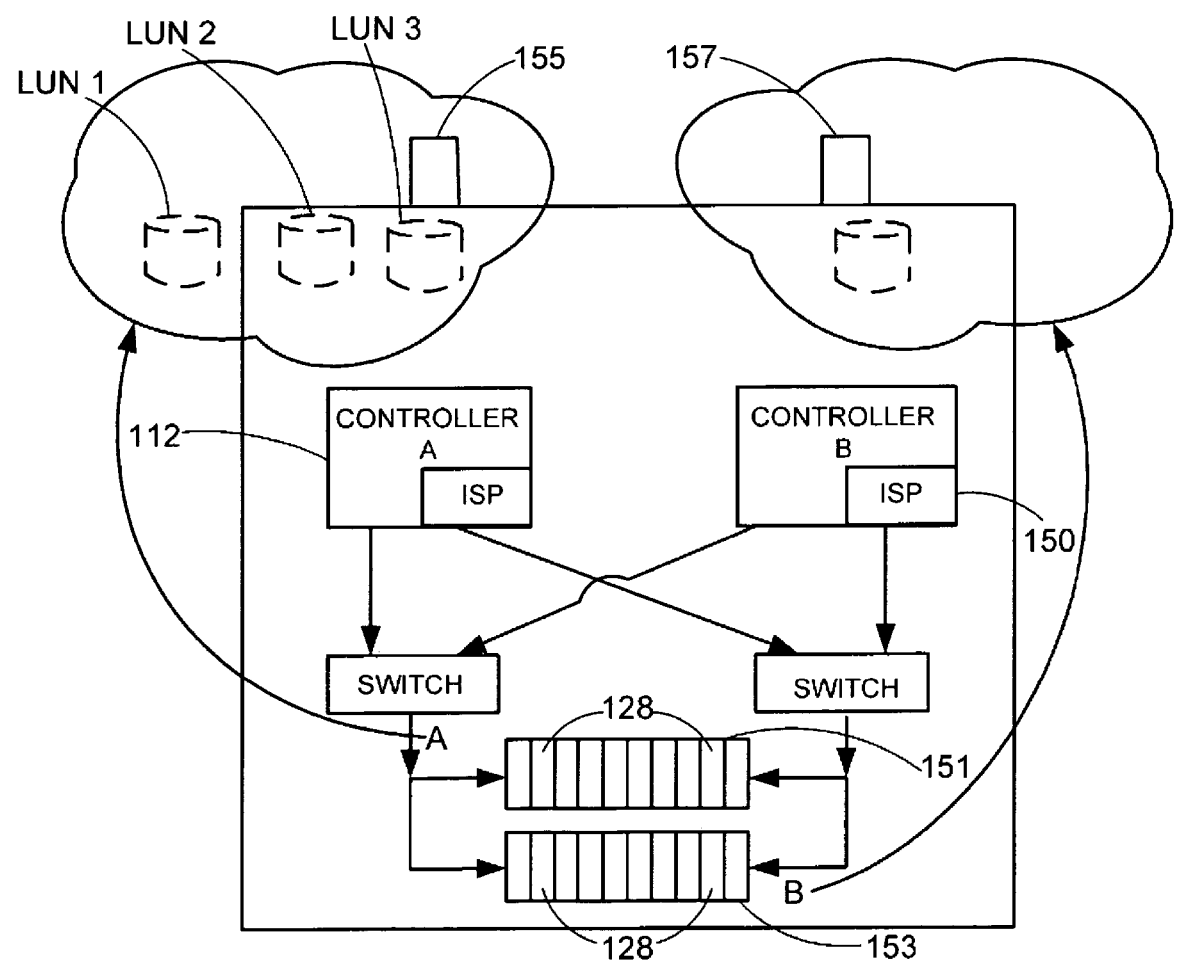
FIG. 11 is a view similar to FIG. 6 but following a host command for allocation of a new storage space.

In FIG. 11 the ISE 108 has created another LUN 3 in response to a host command for more storage capacity. The present embodiments contemplate a manner of accelerating a restriping of data that already exists in LUN 1 and LUN 2 across all three LUNS. Advantageously, the accelerated restriping of the present embodiments does not require the comparatively time-consuming procedure in related art solutions of backing up the existing data and then restoring it to the newly configured storage space. That is, in the present solution the ISE 108 can be otherwise available to the system 100 based solely on the time when the restriping process is initiated and the rate of restriping, according to the procedure described herein. The time it is initiated and the rate with which data are transferred can be varied, such as in relation to other system 100 resource requirements, in order to minimize the restriping process adverse effects on the system 100 performance. Also, by simplifying the inputs to the restriping application, and by offloading the application from the remote host 102, the present embodiments accelerate the process at less overhead expense to the distributed system 100 as a whole.

Figures 12, 13:
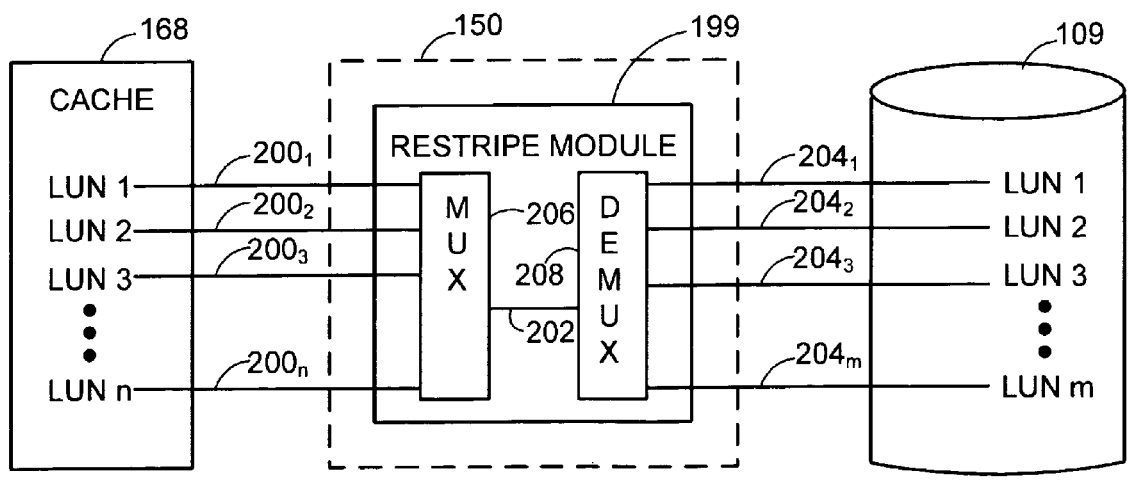
FIG. 12 is a matrix representation of the data stored in LUN 1 and LUN 2 in FIG. 6.
FIG. 13 is a diagrammatic depiction of a software system configured for operation in accordance with embodiments of the present invention.

FIG. 12 shows for purposes of this discussion that LUN 1 and LUN 2 are both filled to capacity with stored data. The columns A-H represent each of the data storage devices 128 (or "domains") within the data pack 151. The intersection of each column and row, such as labeled "A1," represent a chunk of storage capacity allocated to each of the domains. The plurality of chunks in each row forms a stripe of storage capacity across all the domains. Accordingly, the first stripe in LUN 1 is made up of chunks A1-H1, and the first stripe in LUN 2 is made up of chunks A5-H5. The space between the end of LUN1 and the beginning of LUN 2 is only for illustrative clarity. It is assumed that there is in fact no gap in the storage space between these or any other consecutive LUNS.

FIG. 13 diagrammatically shows the ISP 150 executes a software (or firmware) system 199 that is resident in memory and configured to read data from a selected plurality of LUNS via paths 200, and encode that data into a single channel via path 202. The software system 199 then decodes the encoded data in order to restripe the data in a second plurality of logical units via paths 204.

Preferably, the software system 199 executes a multiplexing operation ("mux") 206 to encode the data and a demultiplexing operation ("demux") 208 to decode the encoded data. For purposes of the present discussion the data originally stored in LUN 1 and LUN 2 (FIG. 12) will be restriped across LUNS 1-3 in accordance with embodiments of the present invention. In other words, presently stored data will be restriped from two LUNS to three LUNS. Accordingly, n=2 and m=3 in FIG. 13.

Figures 16, 17:
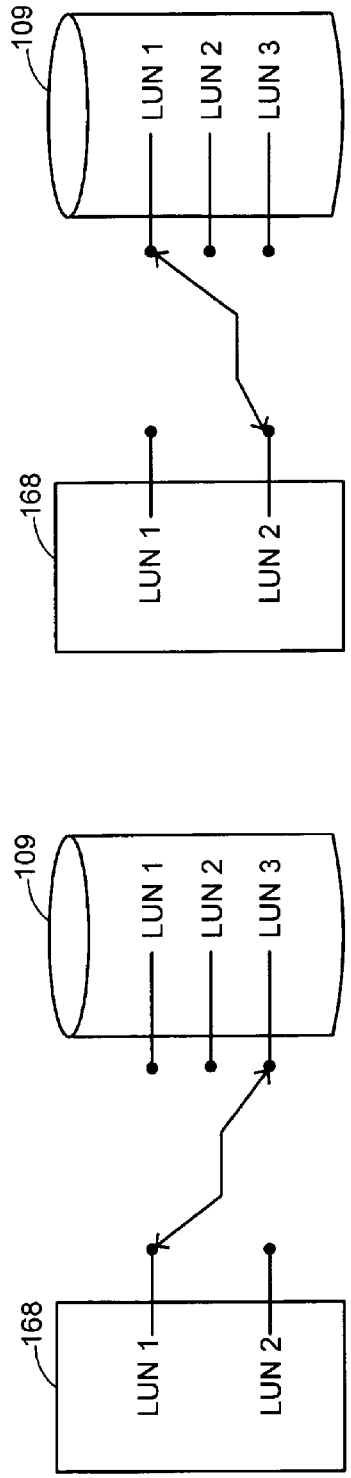

FIG. 14 diagrammatically depicts the multiplex-demultiplex software-controlled circuitry that begins by reading data stripe A1-H1 from LUN 1 (from cache 168) and storing it to LUN 1. FIG. 15 shows how the multiplex-demultiplex circuitry synchronously sequences across the input sources and output destinations, thereby next reading data stripe A5-H5 from cache 168 and storing it in LUN 2. FIG. 16 well illustrates the manner in which the multiplex-demultiplex circuitry serially loops through the input sources and the output destinations. That is, having sequenced through all the input sources, the multiplexing operation returns to LUN 1 even though the demultiplexing operation has not yet sequenced through all the output destinations.

Figures 18, 19:
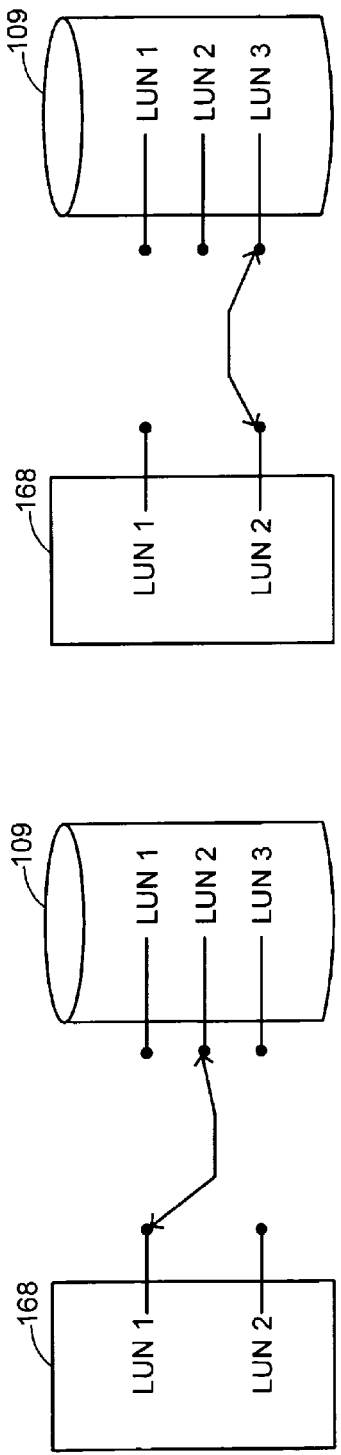
Figures 20, 21:
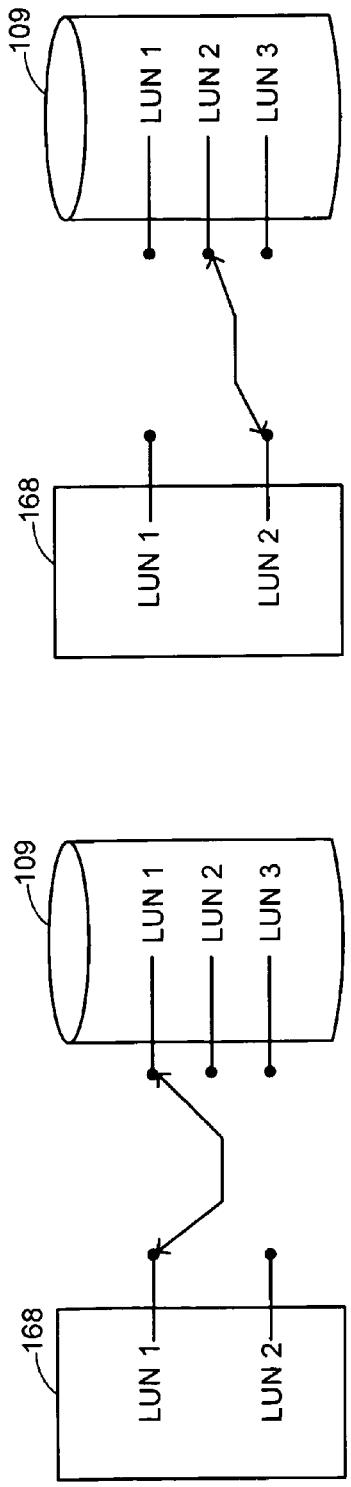

In FIG. 17 the data stripe A6-H6 is read from cache 168 and stored to LUN 1. In FIG. 18 the multiplex-demultiplex circuitry sequences to next read data stripe A3-H3 from cache 168 and store it to LUN 2. In FIG. 19 data stripe A7-H7 is stored to LUN 3. In FIG. 20 data stripe A4-H4 is stored to LUN 1. Finally, in FIG. 21 data stripe A8-H8 is stored to LUN 2.

Figures 24, 25:
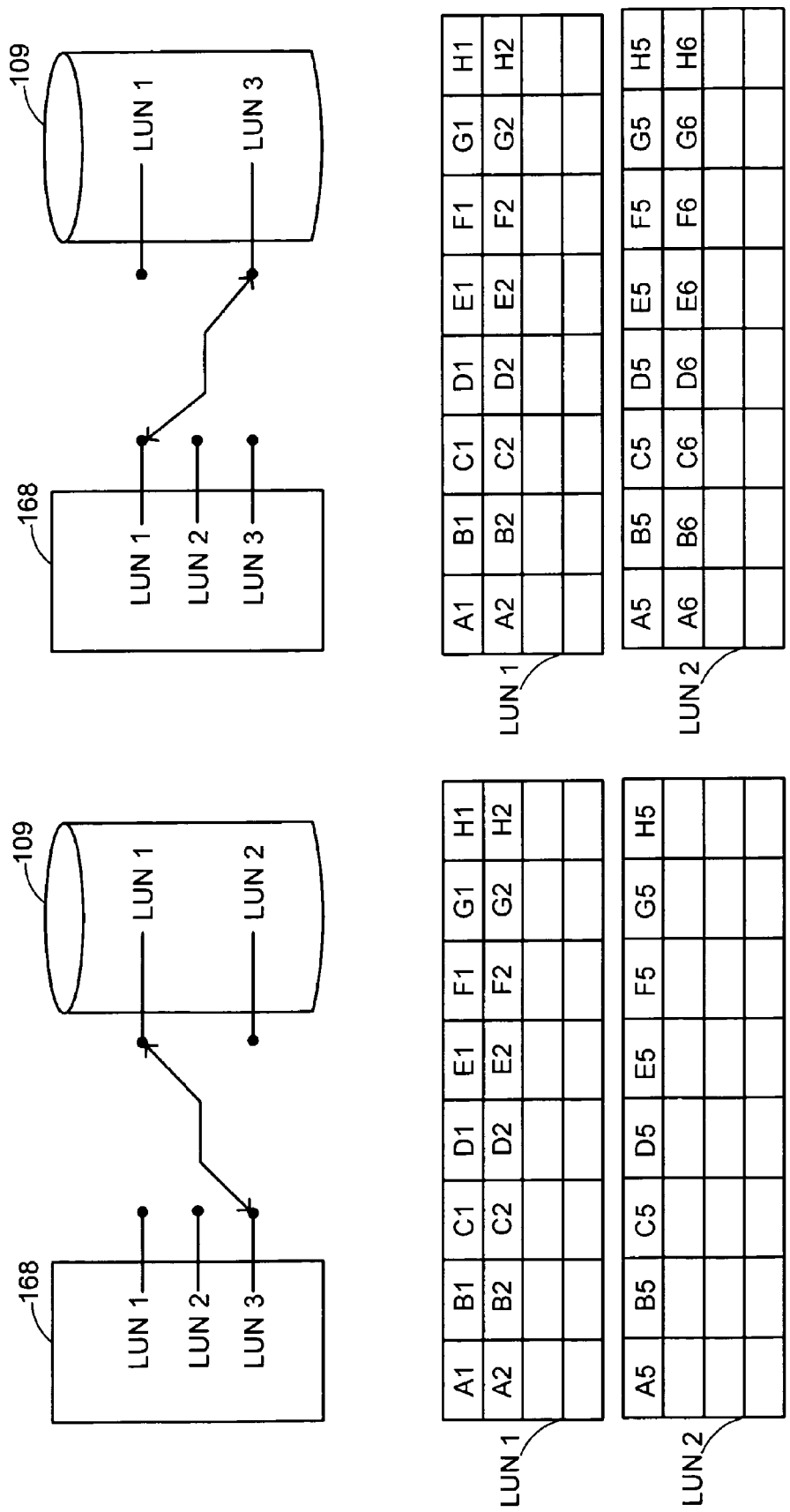
Figures 26, 27:
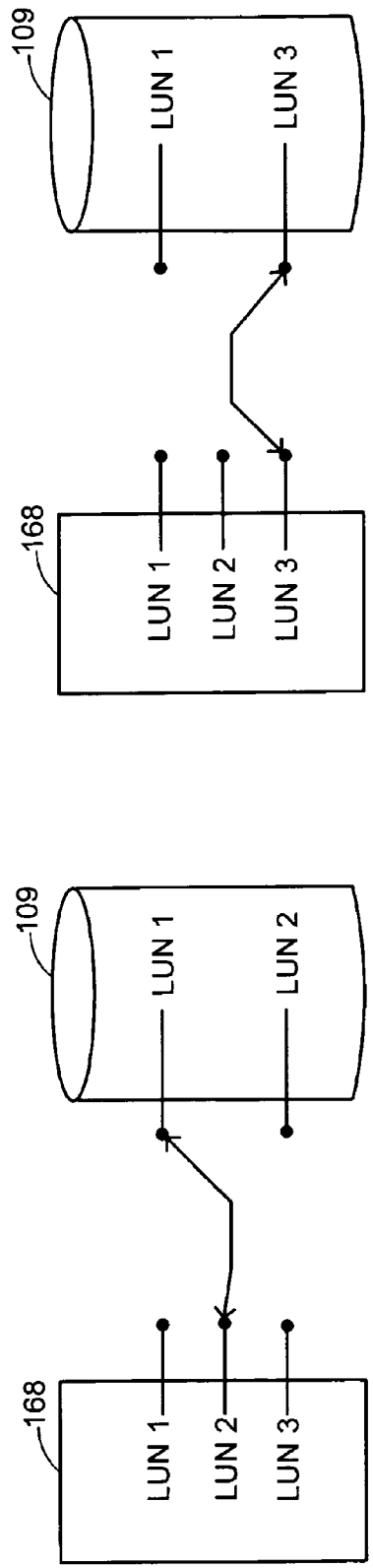
Figure 29:
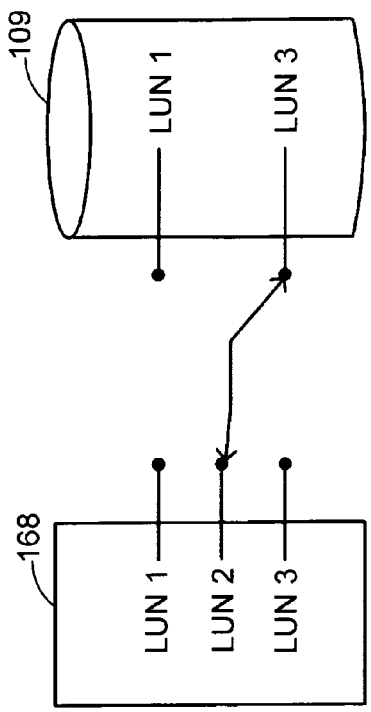
Figure 28:
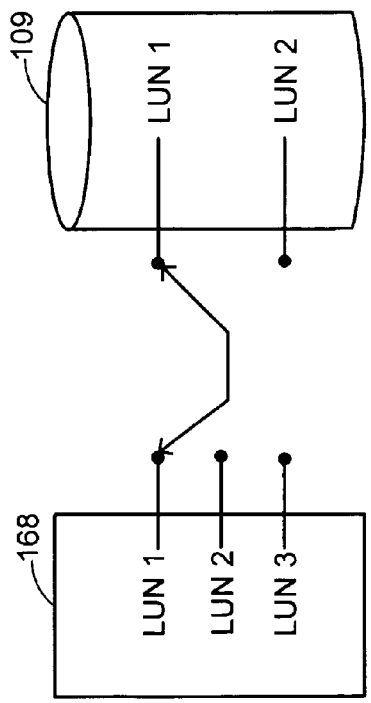

The restriping utility described in FIGS. 14-21 is reversible by carrying out basically the same procedure but where n=3 and m=2. Considering the originally stored data as being in the state shown by FIG. 21, FIG. 22 begins a restore process by storing data stripe A1-H1 in LUN 1. In FIG. 23 the multiplexing-demultiplexing circuitry has sequentially sequenced in order to store data stripe A5-H5 in LUN 2. FIG. 24 shows the circuitry next stores data stripe A2-H2 in LUN 1; in FIG. 25 data stripe A6-H6 is stored in LUN 2; in FIG. 26 data stripe A3-H3 is stored in LUN 1; in FIG. 27 data stripe A7-H7 is stored in LUN 2; in FIG. 28 data stripe A4-H4 is stored in LUN 1. Finally, in FIG. 29 data stripe A8-H8 is stored in LUN 2.

Figure 30:
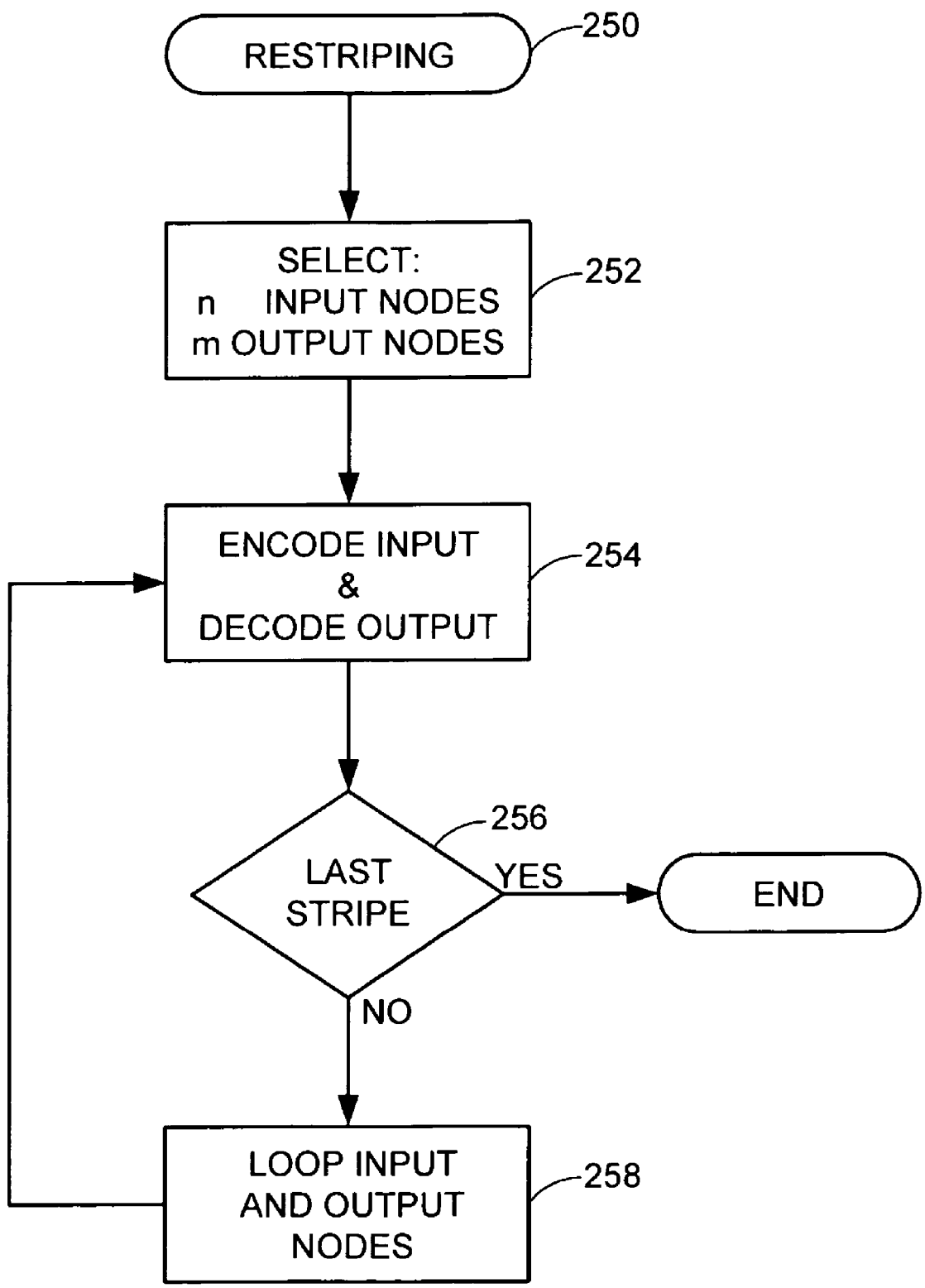
FIG. 30 is a flowchart showing steps in a method for RESTRIPING in accordance with embodiments of the present invention.

FIG. 30 is a flowchart of steps in a method 250 for RESTRIPING in accordance with embodiments of the present invention. The method 250 begins in block 252 by selecting the number of input nodes n and the number of output nodes m for the multiplexing-demultiplexing operation. For example, for the restriping of data from two LUNS to three LUNS in FIGS. 14-21, n=2 and m=3. In block 254 data is synchronously encoded from an input node and decoded to an output node. In block 256 it is determined whether the last data stripe has been restriped in the newly configured logical volume. If the determination of block 256 is yes, then the method 250 ends; otherwise, control passes to block 258. In block 258 the multiplexing operation and the demultiplexing operation are sequentially looped to the next respective nodes, and control returns to block 254 where the data is coded and decoded at the next nodes.

Figure 31:
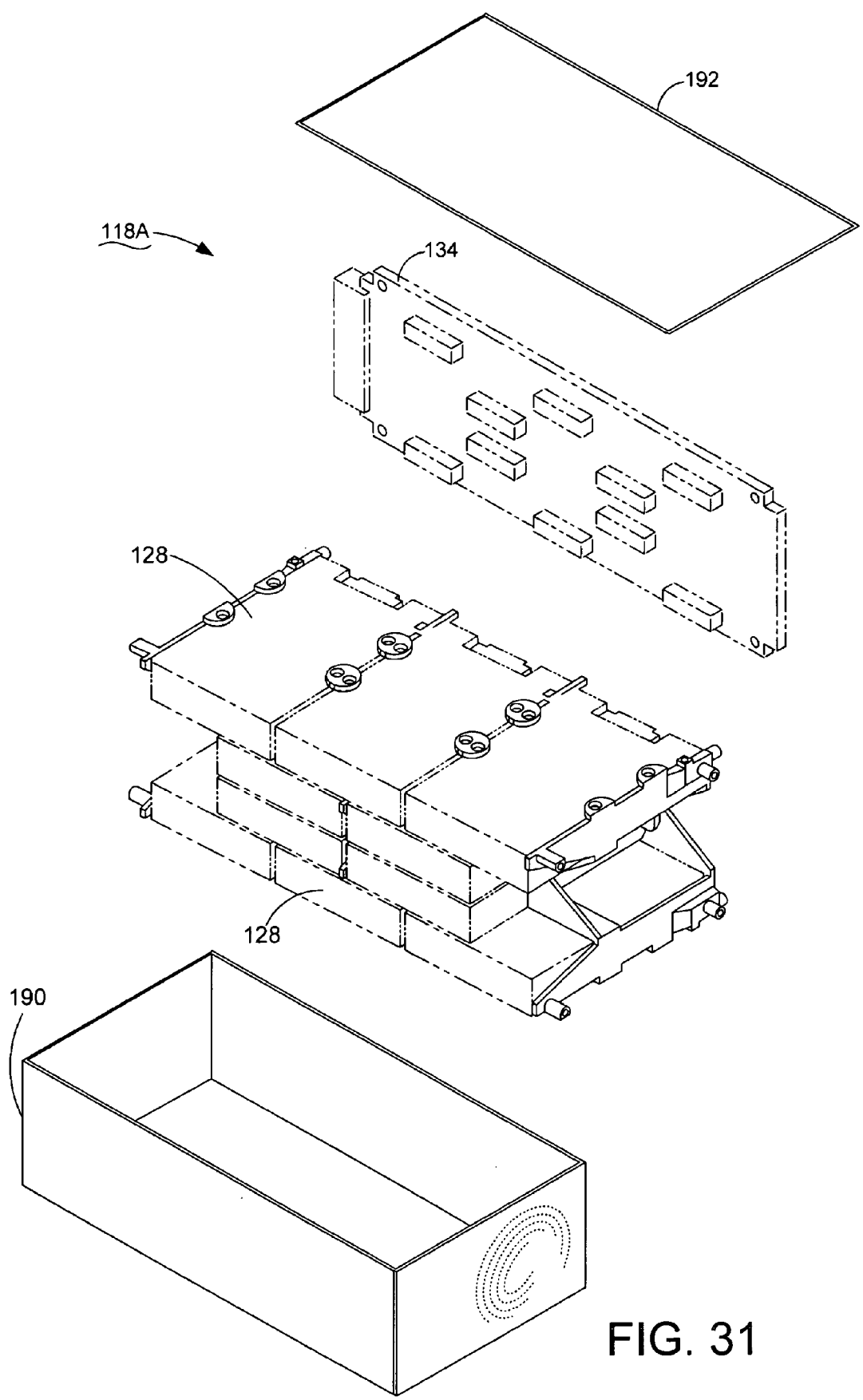
FIG. 31 is an exploded isometric view similar to FIG. 4 but with the data storage devices and circuit board contained within a sealed enclosure.

Finally, FIG. 31 is a view similar to FIG. 4 but with the plurality of data storage devices 128 and circuit board 134 contained within a sealed enclosure made from a base 190 with a cover 192 sealingly attached thereto. Sealingly engaging the data storage devices 128 forming the MDA 118A provides numerous advantages to the user including guaranteeing the arrangement of the data storage devices 128 is not altered from a preselected optimal arrangement. Such an arrangement also permits the MDA 118A manufacturer to tune the system for optimal performance, given that the number, size, and type of data storage devices 128 can be clearly defined.

The sealed MDA 118A also allows the manufacturer to maximize the reliability and fault tolerance of the group of storage medium within. This is done by optimizing the drives in the multi-spindle arrangement. Design optimizations can reduce cost, increase performance, increase reliability, and generally extend the life of data within the MDA 118A. Furthermore, the design of the MDA 118A itself provides an almost zero rotational vibration and high cooling efficiency environment, which is the subject matter of pending U.S. application Ser. No. 11/145,404 entitled Storage Array with Enhanced RVI and assigned to the assignee of the present application. This allows the storage medium within to be manufactured to less costly standards without compromising the MDA 118 reliability, performance, or capacity. The sealed MDA 118A thus provides no single point of failure and near perfect rotational vibration avoidance and cooling efficiency. This allows designing the MDA 118A for optimal disc medium characteristics, and reduces cost while at the same time increasing reliability and performance.

In summary, a self-contained ISE for a distributed storage system is provided, including a plurality of rotatable spindles each supporting a storage medium adjacent a respective independently moveable actuator in a data storing and retrieving relationship with the storage medium. The ISE further includes an ISP adapted for mapping a virtual storage volume to the plurality of mediums for use by a remote device of the distributed storage system.

In some embodiments the ISE has the plurality of spindles and mediums contained within a common sealed housing. Preferably, the ISP allocates memory in the virtual storage volume for storing data in a fault tolerant manner, such as in a RAID methodology. The ISP is furthermore capable of performing managed reliability methodologies in the data storage process, such as initiating in-situ deterministic preventive recovery steps in response to an observed predicted storage failure. Preferably, the ISE is made of a plurality of data storage devices each having a disc stack made of two of more discs of data storage medium.

In other embodiments an ISE is contemplated for a distributed storage system comprising a self-contained plurality of discrete data storage devices and an ISP communicating with the data storage devices and adapted for abstracting a command received from a remote device and associating related memory accordingly. Preferably, the ISP is adapted for mapping a virtual storage volume to the plurality of data storage devices for use by one or more remote devices of the distributed storage system. As before, the plurality of data storage devices and mediums can be contained within a common sealed housing. Preferably, the ISP allocates memory in the virtual storage volume for storing data in a fault tolerant manner, such as in a RAID methodology. The ISP can furthermore initiate in-situ deterministic preventive recovery steps in the data storage devices in response to an observed predicted storage failure.

In alternative embodiments a distributed storage system is provided comprising a host; and a backend storage subsystem in communication with the host over a network and comprising means for virtualizing a self-contained storage capacity independently of the host.

The means for virtualizing can be characterized by a plurality of discrete individually accessible data storage units. The means for virtualizing can be characterized by mapping a virtual block of storage capacity associated with the plurality of data storage units. The means for virtualizing can be characterized by sealingly containerizing the plurality of data storage units and associated controls. The means for virtualizing can be characterized by storing data in a fault tolerant manner, such as without limitation to RAID methodology. The means for virtualizing can be characterized by initiating in-situ deterministic preventive recovery steps in response to an observed predicted storage failure. The means for virtualizing can be characterized by a multiple spindle data storage array.

For purposes herein the term "means for virtualizing" expressly does not contemplate previously attempted solutions that included the system intelligence for mapping the data storage space anywhere but within the respective data storage subsystem. For example, "means for virtualizing" does not contemplate the use of a storage manager to control the functions of data storage subsystems; neither does it contemplate the placement of the manager or switch within the SAN fabric, or within the host.

The present embodiments further contemplate a data storage device having a software system that is resident in a memory space and configured to encode data retrieved from a first number of logical units into a single channel in order to store the data in a second number of logical units. Preferably the software system is configured to decode the encoded data before storing the data in the second number of logical units.

For example, the software system can be configured to multiplex the data that is originally striped across the first number of logical units to encode the data. In this case the software system can be configured to demultiplex the encoded data in order to restripe the data across the second number of logical units. Preferably, the software system synchronously loops the data multiplexing and the data demultiplexing across one or more input sources and one or more output destinations, respectively.

The first number of logical units and the second number of logical units can be different; that is, in some cases the second number is greater than the first number and in other cases the first number is greater than the second number.

The software system can also restore the original striping of the data across the first number of logical units by multiplexing the restriped data from the second number of logical units.

In some embodiments the software system can be resident in an intelligent storage element of a distributed storage system.

In other embodiments a method is provided for encoding data that is striped across a first number of logical units, and decoding the encoded data across a second number of logical units. The encoding step can be characterized by multiplexing data originally striped in the first number of logical units, and the decoding step can be characterized by demultiplexing the encoded data in order to restripe the data across the second number of logical units. Preferably, the encoding step and decoding step are characterized by synchronously looping the data multiplexing and the data demultiplexing to one or more input sources and one or more output destinations, respectively. The method can also contemplate restoring the original striping of the data across the first number of logical units by multiplexing the restriped data from the second number of logical units.

In other embodiments a data storage system is provided having an intelligent storage element with a memory space, and means for restriping data in logical units of the memory space. For purposes of the present description and meaning of the appended claims the meaning of the phrase "means for restriping" explicitly requires an encoding/decoding operation as described herein, such as but not limited to the multiplexing and demultiplexing operations described. The meaning of "means for restriping" expressly does not include previous attempted solutions involving backing up the originally stored data and then restoring it in the new striped arrangement.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A data storage device comprising a software system resident in a memory space configured to encode data retrieved from a first number of logical units into a single channel in order to store the data in a second number of logical units different than the first number of logical units.

2. The device of claim 1 wherein the software system is configured to decode the encoded data before storing the data in the second number of logical units.

3. The device of claim 2 wherein the software system is configured to multiplex the data that is originally striped across the first number of logical units to encode the data.

4. The device of claim 3 wherein the software system is configured to demultiplex the encoded data in order to restripe the data across the second number of logical units.

5. The device of claim 4 wherein the software system is configured to restore the original striping of the data across the first number of logical units by multiplexing the restriped data from the second number of logical units.

6. The device of claim 4 wherein the software system is configured to synchronously sequence the data multiplexing and the data demultiplexing across one or more input sources and one or more output destinations, respectively.

7. The device of claim 6 wherein the software system is configured to serially loop through the input sources and the output destinations during data multiplexing and data demultiplexing, respectively.

8. The device of claim 7 wherein the software system is resident in an intelligent storage element of a distributed storage system.

9. The device of claim 1 wherein the second number is greater than the first number.

10. The device of claim 1 wherein the first number is greater than the second number.

11. A method comprising:
    encoding data that is striped across a first number of logical units into a single channel; and
    decoding the encoded data across a second number of logical units different than the first number of logical units.

12. The method of claim 11 wherein the encoding step is characterized by multiplexing data originally striped in the first number of logical units.

13. The method of claim 12 wherein the decoding step is characterized by demultiplexing the encoded data in order to restripe the data across the second number of logical units.

14. The method of claim 13 further comprising restoring the original striping of the data across the first number of logical units by multiplexing the restriped data from the second number of logical units.

15. The method of claim 13 wherein the encoding step and decoding step are characterized by synchronously looping the data multiplexing and the data demultiplexing to one or more input sources and one or more output destinations, respectively.

16. The method of claim 11 wherein the first number is characterized as being greater than the second number.

* * * * *